United States Patent
Zimmel et al.

(10) Patent No.: US 10,351,298 B2
(45) Date of Patent: Jul. 16, 2019

(54) HOT MELT ADHESIVE COMPOSITION FOR BONDING PACKS OF METAL CONTAINERS

(71) Applicant: H.B. Fuller Company, St. Paul, MN (US)

(72) Inventors: John M. Zimmel, St. Paul, MN (US); Ameara S. Mansour, Woodbury, MN (US); Stefan Juers, Lueneburg (DE); Vera Axer, Hamburg (DE); Ulrich Holtin, Melbeck (DE); Alan R. Nahkala, Stillwater, MN (US)

(73) Assignee: H.B. Fuller Company, St. Paul, MN (US)

( * ) Notice: Subject to any disclaimer, the term of this patent is extended or adjusted under 35 U.S.C. 154(b) by 56 days.

(21) Appl. No.: 15/536,019

(22) PCT Filed: Dec. 17, 2015

(86) PCT No.: PCT/US2015/066482
§ 371 (c)(1),
(2) Date: Jun. 14, 2017

(87) PCT Pub. No.: WO2016/100728
PCT Pub. Date: Jun. 23, 2016

(65) Prior Publication Data
US 2018/0370683 A1    Dec. 27, 2018

Related U.S. Application Data

(60) Provisional application No. 62/093,094, filed on Dec. 17, 2015.

(51) Int. Cl.
| | | |
|---|---|---|
| *B65D 21/02* | (2006.01) | |
| *C09J 153/00* | (2006.01) | |
| *C08L 45/00* | (2006.01) | |
| *C08L 91/00* | (2006.01) | |
| *C08F 110/06* | (2006.01) | |
| *C08F 210/16* | (2006.01) | |
| *C08K 5/00* | (2006.01) | |
| *C09J 11/06* | (2006.01) | |
| *C09J 11/08* | (2006.01) | |
| *C08L 91/06* | (2006.01) | |

(52) U.S. Cl.
CPC ........ *B65D 21/0205* (2013.01); *C08F 110/06* (2013.01); *C08F 210/16* (2013.01); *C08K 5/0016* (2013.01); *C08L 45/00* (2013.01); *C08L 91/00* (2013.01); *C09J 11/06* (2013.01); *C09J 11/08* (2013.01); *C09J 153/00* (2013.01); *C08F 2500/12* (2013.01); *C08F 2500/17* (2013.01); *C08L 91/06* (2013.01)

(58) Field of Classification Search
CPC ..... B65D 21/0205; C09J 153/00; C09J 11/06; C09J 11/08; C08L 45/00; C08L 91/00; C08L 91/06; C08F 110/06; C08F 210/16; C08F 2500/12; C08F 2500/17
See application file for complete search history.

(56) References Cited

U.S. PATENT DOCUMENTS

| | | |
|---|---|---|
| 4,411,954 A | 10/1983 | Butch et al. |
| 4,526,577 A | 7/1985 | Schmidt et al. |
| 4,578,302 A | 3/1986 | Schmidt et al. |
| 4,822,653 A | 4/1989 | Kauffman et al. |
| 5,001,179 A | 3/1991 | Kauffman et al. |
| 5,037,411 A | 8/1991 | Malcolm et al. |
| 5,090,861 A | 2/1992 | Malcolm et al. |
| 5,418,052 A | 5/1995 | Sugie et al. |
| 5,714,254 A | 2/1998 | Jacob |
| 5,939,483 A | 8/1999 | Keppers |
| 6,103,814 A | 8/2000 | VanDrongelen et al. |
| 6,162,859 A | 12/2000 | Lu et al. |
| 6,486,229 B1 | 11/2002 | Ziyi et al. |
| 6,818,093 B1 | 11/2004 | Taal et al. |
| 6,987,142 B2 | 1/2006 | St Clair et al. |
| 7,262,251 B2 | 8/2007 | Kanderski et al. |
| 7,906,583 B2 | 3/2011 | Lechat et al. |
| 8,263,696 B2 | 9/2012 | Goubard et al. |
| 8,703,263 B2 | 4/2014 | De Keyzer et al. |
| 2003/0181584 A1 | 9/2003 | Dale et al. |
| 2005/0176887 A1 | 8/2005 | St. Clair |
| 2005/0182194 A1 | 8/2005 | He |
| 2006/0234580 A1 | 10/2006 | Sustic |
| 2007/0249781 A1 | 10/2007 | De Keyzer et al. |
| 2008/0081858 A1 | 4/2008 | Okazaki |
| 2008/0153981 A1 | 6/2008 | Goubard et al. |
| 2008/0306214 A1 | 12/2008 | Kanderski |
| 2009/0291298 A1 | 11/2009 | Robert et al. |
| 2011/0021103 A1 | 1/2011 | Alper et al. |
| 2014/0324006 A1 | 10/2014 | Zhong |
| 2015/0037579 A1 | 2/2015 | Juers et al. |
| 2015/0197671 A1 | 7/2015 | Becker |
| 2016/0068723 A1 | 3/2016 | Moriguchi et al. |

FOREIGN PATENT DOCUMENTS

| | | |
|---|---|---|
| EP | 0302394 B1 | 2/1989 |
| EP | 1564273 A1 | 8/2005 |
| EP | 1566423 A1 | 8/2005 |
| EP | 1719809 A2 | 11/2006 |
| GB | 1456003 | 11/1976 |
| JP | 62081470 A | 4/1987 |
| JP | 63043983 A | 2/1988 |
| JP | 1144483 | 6/1989 |
| JP | 6078508 | 10/1994 |
| JP | 7057867 B2 | 6/1995 |
| JP | 02637269 | 8/1997 |
| JP | 03495277 | 2/2004 |

(Continued)

*Primary Examiner* — Michael C Miggins
(74) *Attorney, Agent, or Firm* — Kirsten Stone; Kristi Halloran

(57) ABSTRACT

The present invention relates to a hot melt adhesive composition, comprising based on the total weight of the hot melt adhesive composition: (a) from about 10 to about 50 weight percent of at least one block copolymer; (b) from about 15 to about 50 weight percent of at least one plasticizer; (c) from about 15 to about 50 weight percent of at least one resins; (d) optionally up to 25 weight percent of at least one semicrystalline polyolefin; and (e) optionally up to 10 weight percent of at least one wax. The hot melt adhesive composition of the invention can be used for bonding bundles of metal containers such as cans into packs.

20 Claims, No Drawings

(56) References Cited

FOREIGN PATENT DOCUMENTS

| | | |
|---|---|---|
| WO | WO1992/008763 A1 | 5/1992 |
| WO | WO98/00471 | 1/1998 |
| WO | WO98/02498 A1 | 1/1998 |
| WO | WO2000/023537 | 4/2000 |
| WO | WO2003/044087 A2 | 11/2007 |
| WO | WO2009/106466 | 9/2009 |
| WO | WO2013/004337 | 1/2013 |
| WO | WO2013/004339 | 1/2013 |
| WO | WO2013/004340 | 1/2013 |
| WO | WO2013/004341 | 1/2013 |
| WO | WO2013/011561 | 1/2013 |
| WO | WO2014/189150 | 11/2014 |
| WO | WO2015/007785 | 1/2015 |

HOT MELT ADHESIVE COMPOSITION FOR BONDING PACKS OF METAL CONTAINERS

FIELD OF THE INVENTION

The present invention relates to a hot melt adhesive composition comprising a block copolymer, a plasticizer, and a resin. The hot melt adhesive composition according to the present invention is especially suitable for bonding metal containers such as metal cans into packs. Thus, the present invention also relates to the use of the inventive hot melt adhesive composition for bonding bundles of metal containers into packs. The present invention further relates to a container pack comprising a plurality of metal containers, wherein the containers are bonded to each other with a hot melt adhesive composition according to the invention.

BACKGROUND OF THE INVENTION

Hot melt adhesive compositions are well known in the art. Such hot melt adhesives are typically solid at room temperature and are applied to a substrate when molten, and then placed in contact with a second substrate. The adhesive cools and hardens to form a bond between the substrates. Hot melt adhesives are typically composed of at least two components: (a) a polymer; and (b) a resin. Optionally, various amounts of wax and plasticizer may further be employed. The polymer provides the formulation with its strength and adhesive characteristics. Typically, a thermoplastic polymer is used. The thermoplastic polymer may be selected from homopolymers, copolymers (e.g. interpolymers) or block copolymers. The resin allows the thermoplastic polymer to be more adhesive by improving wetting during the application. Resins are added to give tack to the adhesive and also to lower viscosity. Tack is required in most adhesive formulations to allow for proper joining of articles prior to the hot melt adhesive solidifying. One function of the wax component is to lower the viscosity of the hot melt adhesive. Low viscosity helps to lower application temperatures, provide cleaner processing, and also good wet out of the substrates. Furthermore, a low viscosity allows for liquefaction of the hot melt adhesive. In addition, due to the presence of the wax component, the hot melt adhesive crystallizes quickly which helps the material to harden or set quickly. Thus, the wax component also controls the open time and set speed of the system. The plasticizer also helps to lower viscosity and can additionally be used to impart permanent tack properties to the hot melt adhesive.

It is known in the art to use hot melt adhesives for bonding containers into packs. For example, WO 2013/004340 and WO 2013/004337 describe methods for producing packs of containers by bonding the containers to each other using an adhesive such as a hot melt adhesive. By directly bonding containers such as cans using an adhesive, waste resulting from a shrink wrap with LDPE films on the packs can be avoided. This also saves considerable amounts of energy since, for example, shrink wrapping involves six-packs being moved through a heating tunnel which uses large amounts of energy. Furthermore, a smaller packing line footprint and increased packing line speeds are possible. Also, the optical appearance of six-packs is improved, since undesirable creases in the shrink wrap are avoided. This is highly desirable, because beverage filling companies are especially concerned about the appearance of their packaged product. Generally, any secondary packaging of container packs, such as carton or cardboard cases or sheaths, plastic rings or sheaths, etc. can be limited or even avoided.

However, when using an adhesive such as a hot melt adhesive for directly bonding containers to each other, it is necessary to provide on the one hand a reliable bond between the containers. On the other hand, it is also required to ensure easy separation of the containers so that an individual container can be separated from the pack. Generally, a reliable bond can be provided by using a higher adhesive force, i.e. a stronger bond. By contrast, easy separation can be ensured by applying a lower adhesive force. Thus, providing simultaneously for a reliable bond and for easy separation represent conflicting goals.

Containers can be made from a variety of materials. Therefore, a hot melt adhesive composition used for bonding containers should be specifically selected to reliably bond a given material. Metals such as aluminum or steel are widely used for making containers such as cans. Thus, there is a need in the art for hot melt adhesives for reliably bonding metal containers to each other into packs, while at the same time being easily separable from each other. In particular, the hot melt adhesive at the same time should be able to bond metal cans as well as coated metal cans, e.g. varnish coated, printed or plastic coated cans, etc. It is further desirable that such hot melt adhesives are removable (i.e. can be stripped cleanly from the container, leaving no adhesive residue behind) after use, e.g. during recycling.

SUMMARY OF THE INVENTION

The objection of the present invention is to meet the above needs. In particular, an object of the present invention is the provision of a hot melt adhesive composition especially suitable for bonding metal containers into packs.

The present invention relates to a hot melt adhesive composition, comprising based on the total weight of the hot melt adhesive composition:
a) from about 10 to about 50 weight percent of at least one block copolymer;
b) from about 15 to 50 weight percent of at least one plasticizer;
c) from about 15 to 50 weight percent of at least one resin;
d) optionally up to 25 weight percent of at least one semicrystalline polyolefin; and
e) optionally up to 10 weight percent of at least one wax.

For example, the hot melt adhesive composition according to the present invention comprises, based on the total weight of the hot melt adhesive composition, from about 12 to about 45 weight percent, from about 15 to about 42 weight percent, from about 17 to about 40 weight percent of the at least one block copolymer, from about 10 to about 30 weight percent, or even from about 30 to about 50 weight percent of the at least one block copolymer.

In combination with the above or alternatively, the at least one block copolymer has a triblock, radial or multiblock content of less than 20 weight percent based on the total weight of the hot melt adhesive composition.

In combination with the above or alternatively, the hot melt adhesive composition according to the present invention comprises, based on the total weight of the hot melt adhesive composition, from about 15 to about 45 weight percent, from about 20 to about 40 weight percent, preferably from about 20 to about 35 weight percent, more preferably from about 22 to about 32 weight percent of the at least one plasticizer.

In combination with the above or alternatively, the hot melt adhesive composition according to the present invention comprises, based on the total weight of the hot melt adhesive composition, from about 20 to about 45 weight percent, preferably from about 23 to about 40 weight percent, more preferably from about 25 to about 35 weight percent of the at least one resin.

In combination with the above or alternatively, the hot melt adhesive composition according to the present invention comprises, based on the total weight of the hot melt adhesive composition, up to about 25 weight percent, up to about 20 weight percent, preferably from 0 to about 15 weight percent, more preferably from 0 to about 13 weight percent of at least one homogenous linear or substantially linear interpolymer of ethylene and α-olefin.

In combination with the above or alternatively, the hot melt adhesive composition according to the present invention comprises, based on the total weight of the hot melt adhesive composition, up to about 25 weight percent, up to about 20 weight percent, preferably from 0 to about 15 weight percent, more preferably from 0 to about 13 weight percent of at least one semicrystalline propylene polymer.

In combination with the above or alternatively, the hot melt adhesive composition according to the present invention comprises, based on the total weight of the hot melt adhesive composition, from 0 to about 7 weight percent, from 2 to about 7 weight percent, preferably from 0 to about 5 weight percent, more preferably from 0 to about 3 weight percent of the at least one wax.

Preferably, the at least one block copolymer has at least one A block that includes a vinyl aromatic compound, and at least one B block that includes an elastomeric hydrogenated or non-hydrogenated conjugated diene and combinations thereof. It is further preferred that the at least one block copolymer is a linear A-B block, linear A-B-A block, linear A-(B-A)$_n$-B multi-block, and radial (A-B)$_n$-Y block where Y is a multivalent compound and n is an integer of at least 3, linear A-B-A-B tetrablock, or linear A-B-A-B-A pentablock copolymer. Suitable are also functionalized or grafted versions of the above block copolymers e.g. grafted with maleic anhydride.

Useful block copolymers include or may be based on, e.g., random styrene-butadiene polymers, styrene-butadiene block copolymers, multiarmed and repeating styrene-butadiene copolymers, styrene-butadiene-styrene (SBS) block copolymers, styrene-isoprene block copolymers, styrene-isoprene-styrene (SIS) block copolymers, styrene-multiarmed styrene-isoprene (SI)x block copolymers, styrene-ethylene-butylene-styrene block copolymers (SEBS), styrene-isobutylene-styrene block copolymers (SIBS), styrene-ethylene-ethylene-propylene-styrene block copolymers (SEEPS), styrene-ethylene-propylene-styrene block copolymers (SEPS) and combinations thereof.

The at least one block copolymer is preferably a triblock styrenic block copolymer, more preferably is selected from a styrene-ethylene/butylene-styrene (SEBS), styrene-butadiene-styrene (SBS), styrene-ethylene/propylene-styrene (SEPS), styrene-isoprene-styrene block copolymers (SIS), and styrene-ethylene-ethylene-propylene-styrene (SEEPS) block copolymers. Most preferably, the at least one block copolymer is SEBS.

The at least one block copolymer is preferably a styrenic block copolymer. More preferably, the styrenic block copolymer contributes to a triblock, radial or multiblock content of less than 20 weight percent, less than 17 weight percent, or even less than 15 weight percent based on the total weight of the hot melt adhesive composition. The at least one block copolymer preferably has a melt index at 230° C. under a load of 5 kg of less than about 150 g/10 minutes.

The at least one plasticizer may be a mineral oil. Preferably, the at least one plasticizer is a paraffinic or naphthenic mineral oil. More preferably, the at least one plasticizer is a naphthenic mineral oil.

The resin preferably has a Ring & Ball softening point of at least about 75° C., preferably at least about 100° C.

The at least one resin may comprise a combination of at least two different resins, wherein preferably at least one resin is an aromatic hydrocarbon resin and at least one resin is an aliphatic hydrocarbon resin. The weight ratio of aromatic hydrocarbon resin to aliphatic hydrocarbon resin may be e.g. 1:20 to 1:2, more preferably is 1:15 to 1:3, and still more preferably is 1:10 to 1:5.

The aliphatic hydrocarbon resin may in some embodiments be selected from aliphatic and cycloaliphatic hydrocarbon resins, hydrogenated hydrocarbon resins, terpenes, modified terpenes and hydrogenated versions thereof; natural rosins, modified rosins, rosin esters, and hydrogenated versions thereof; and combinations thereof. Preferably, the aliphatic hydrocarbon resin is a hydrogenated hydrocarbon resin, such as hydrogenated dicyclopentadiene hydrocarbon resin. In some embodiments, the aliphatic hydrocarbon resin may be aromatic modified i.e. include minor amounts of aromatic vinyl monomers in an amount of up to 15 weight percent.

The aromatic hydrocarbon resin is derived from aromatic vinyl monomers. Aromatic hydrocarbon resins typically have greater than 50 weight percent aromatic content, or even greater than 60 weight percent aromatic content. In some embodiments, the aromatic hydrocarbon resin comprise monomers selected from the group consisting of styrene, alpha methyl styrene, vinyl toluene, and indene or any other aromatic monomer or end block associating monomer. The aromatic hydrocarbon resin preferably has a softening point of 100° C. or more.

The at least one semicrystalline polyolefin may comprise a homogenous linear or substantially linear interpolymer of ethylene and α-olefin has a melt flow index in the range of about 100 to about 1,500 g/10 min (at 190° C./2.16 kg), preferably of about 400 to about 800 g/10 min. Preferably, the α-olefin is selected from the group consisting of 1-octene and 1-hexene.

In combination with the above or alternatively, the at least one semicrystalline polyolefin may comprise a propylene polymer preferably has a melt viscosity at 190° C. of about 500 mPa·s to about 20,000 mPa·s, more preferably 1,000 to 15,000, more preferably 5000 mPa·s to about 10,000 mPa·s.

The optional wax may be selected e.g. from paraffin waxes, microcrystalline waxes, Fischer-Tropsch waxes, synthetic high melting point waxes (HMP), polyethylene wax, polypropylene wax, maleated (functionalized with maleic acid or maleic anhydride) or functional wax (e.g. a wax having a heteroatom or a maleated wax). Preferably, the wax if present is a polyethylene or polypropylene wax, more preferably the wax is maleated.

The hot melt adhesive composition according to the present invention may also comprise conventional additives. For example, the hot melt adhesive composition may comprise at least one additive selected from antioxidants, antiblock additives (e.g. a coextrusion coating, ZP film, or dusting agents, etc.), pigments, rheology modifying additives (e.g. fumed silica), adhesion promoters and fillers (e.g. clay, talc, or carbonates).

The hot melt adhesive composition according to the present invention may preferably have a Brookfield viscosity at a temperature of 149° C. (spindle 27, spindle speed of 20 rpm), in the range of from about 1,500 to about 50,000 cps, from about 2,000 to about 20,000 cps, or even from about 3,000 to about 15,000 cps, or even from about 2,000 to about 10,000 cps.

In the hot melt adhesive composition according to the invention, the sum of components a), b), c) and d) amounts preferably to at least 90 weight percent. More preferably, the sum of components a), b), c) and d) amounts at least 95 weight percent of the total adhesive composition.

In an embodiment, the hot melt adhesive composition according to the present invention consists essentially of, based on the total weight of the hot melt adhesive composition:
(a) 19 to 22 weight percent of SEBS, preferably having based on the total weight of the SEBS a styrene content of 11 to 15 weight percent and a diblock content of 28 to 32 weight percent;
(b) 31 to 35 weight percent of naphthenic oil;
(c) 22.5 to 26.5 weight percent of cycloaliphatic resin;
(d) 1 to 10 weight percent of aromatic resin selected from alpha methyl styrene resins and vinyl toluene resins, preferably having a weight average molecular weight of 3000 to 4000 and a number average molecular weight of 1000 to 2000;
(e) 5 to 15 weight percent of semicrystalline propylene homopolymer, preferably having having a melt viscosity at 190° C. of 7500 mPa·s to 9500 mPa·s;
(f) 5 to 15 weight percent of homogenous linear or substantially linear interpolymer of ethylene and either 1-octene or 1-hexene, preferably having a melt flow index in the range of 400 to about 600 g/10 min; and
(g) optionally up to 0.5 weight percent of antioxidants, wherein the hot melt adhesive composition has a Brookfield viscosity at a temperature of 149° C. in the range from 12,000 to about 14,000 mPa·s.

In another embodiment, the hot melt adhesive composition according to the present invention consists essentially of, based on the total weight of the hot melt adhesive composition:
(a) 35.5 to 39.5 weight percent of SEBS, preferably having based on the total weight of the SEBS a styrene content of 28 to 32 weight percent and a diblock content of 65 to 75 weight percent;
(b) 28 to 32 weight percent of naphthenic oil;
(c) 22.5 to 26.5 weight percent of cycloaliphatic resin, preferably aromatic modified cycloaliphatic resin;
(d) 1 to 10 weight percent of aromatic resin selected from alpha methyl styrene resins and vinyl toluene resins, preferably having a weight average molecular weight of 3000 to 4000 and a number average molecular weight of 1000 to 2000;
(e) 2 to 3 weight percent of maleated wax; and
(f) optionally up to 1 weight percent of antioxidants, wherein the hot melt adhesive composition has a Brookfield viscosity at a temperature of 149° C. in the range from 3,500 to about 5,500 mPa·s.

In a further embodiment, the present invention provides a hot melt adhesive composition, comprising based on the total weight of the hot melt adhesive composition:
(a) from about 12 weight percent to about 45 weight percent total polymer
(b) from about 15 to 50 weight percent of at least one plasticizer;
(c) from about 18 to 50 weight percent of at least one resin;
(d) optionally up to 10 weight percent of at least one wax. wherein the total polymer comprises one or more styrene block copolymers having a triblock, radial or multiblock content of less than 20 weight percent, such as even less than 17 weight percent, based on the total weight of the hot melt adhesive composition.

Such compositions may have similar total polymer content and a certain triblock, radial or multiblock content in common, although the individual compositions include fairly different polymer blends. For example, a higher triblock containing styrene block copolymer may be used, if less of it and more semi-crystalline polyolefin is employed. Alternatively, a high amount of a low tri-block styrene block copolymer may be used and then the semicrystaliine polyolefin may be omitted.

In still another embodiment, the present invention provides a hot melt adhesive composition, comprising based on the total weight of the hot melt adhesive composition:
(a) 30 to 50 weight percent of SEBS, having based on the total weight of the SEBS a diblock content of 50 to 80 weight percent;
(b) 20 to 35 weight percent of oil;
(c) 15 to 35 weight percent of cycloaliphatic resin;
(d) 1 to 10 weight percent of aromatic resin selected from alpha methyl styrene resins and vinyl toluene resins; and
(e) 1 to about 7 weight percent wax;
wherein optionally the at least one block copolymer has a triblock, radial or multiblock content of less than 20 weight percent based on the total weight of the hot melt adhesive composition.

Furthermore, the present invention relates to the use of the above hot melt adhesive composition for bonding bundles of metal containers such as cans into packs. In some embodiments, the hot melt adhesive composition is applied directly onto the metal containers. Typical examples of metal containers are steel containers or aluminum containers. The containers also may comprise a coating such as a polyester based coating.

In addition, the present invention provides a container pack comprising a plurality of metal containers, wherein the containers are bonded to each other with a hot melt adhesive composition as defined above.

The hot melt adhesive composition of the present invention exhibits a combination of improved properties, including excellent viscosity and color fastness/color stability, particularly at elevated temperatures; high cohesive strength and improved adhesion to metal or coated metal substrates, particularly containers such as cans.

Furthermore, the hot melt adhesive of the present invention is particularly suitable for and designed to form, for example, a six pack of metal cans by directly adhering the cans together with the hot melt adhesive rather than by shrink wrapping, or attaching them to each other with plastic rings.

The hot melt adhesive composition of the invention has a unique combination of good low temperature (for refrigeration) and high temperature (for shipping) resistance, which is required especially for the bonding of metal can packs. For example, packs or bundles of metal cans bonded together with the adhesive of the invention are able to remain bonded when exposed to condensed water on the surface of the can. Furthermore, the adhesives of the invention exhibit well balanced cohesive properties allowing for the metal cans being pulled apart by the consumer when beverages are consumed.

DETAILED DESCRIPTION OF THE INVENTION

In general, hot melt adhesives are thermoplastic compositions as defined herein that are applied in a molten or flowable form. For many applications, hot melt adhesives are employed to bond two or more substrates while the adhesive is sufficiently molten. In other instances, the adhesive may be applied to a single substrate and cooled. The adhesive is subsequently bonded to a second substrate or surface with heat re-activation. For the purpose of the invention, "hot melt adhesive" refers to all such adhesive compositions.

The following abbreviations and definitions are used in the context of the present invention.

The undefined article "a" or "an" means one or more of the species designated by the term following said article. For example, "a particulate form" encompasses one or more particulate forms.

The term "about" in the context of the present application means a value within 15% (±15%) of the value recited immediately after the term "about," including any numeric value within this range, the value equal to the upper limit (i.e., ±15%) and the value equal to the lower limit (i.e., −15%) of this range. For example, the phrase "about 100" encompasses any numeric value that is between 85 and 115, including 85 and 115 (with the exception of "about 100%", which always has an upper limit of 100%). A further exception is the phrase "about 0" or "about 0%", which always has a lower limit of 0 or 0%). In a preferred aspect, "about" means±10%, even more preferably ±5%, even more preferably ±1% or less than ±1%.

The amount of a specific component, which is included in the hot melt adhesive composition may be defined as the weight per weight percentage as defined by the following ratio: wt.-%=(g of specific component)/(g of composition comprising specific components). For example, when 2.5 g of wax in 100 g of a hot melt adhesive are used, this results in a ratio of 2.5 wt-% (2.5/100) of wax.

For the purpose of the present invention, the term "hot melt" or "hot melt composition" refers to a solvent free product which is substantially solid at room temperature, e.g. at a temperature between about 20° C. and about 25° C. When heated the hot melt becomes tacky and preferably liquid (molten) and can be applied, for example to a substrate to provide an adhesive surface.

For the purpose of the present invention, the term semicrystalline polymer means a polymer have a heat of fusion by Differential Scanning Calorimetry (DSC) from greater than 10 J/g to no greater than 60 J/g and a viscosity of at least 750 cP at 190° C.

For the purpose of the present invention, the term propylene-based means that the polymer includes at least 50% by weight propylene.

Further details of the present invention are described in the following.

Block Copolymer

A block copolymer is an essential component of the hot melt adhesive of the present invention. Suitable block copolymers for use in the present invention include those having at least one A block that includes a vinyl aromatic compound and at least one B block that includes an elastomeric conjugated diene, including hydrogenated or non-hydrogenated conjugated dienes, and combinations or functionalized or grafted (e.g. grafted with maleic anhydride) versions thereof. The A blocks and the B blocks may bind to one another in any manner of binding such that the resulting copolymer is random, block, straight-chained, branched, radial, tapered or a combination thereof. The block copolymer can exhibit any form including, e.g., linear A-B block, linear A-B-A block, linear A-(B-A)$_n$-B multi-block, and radial (A-B)$_n$-Y block where Y is a multivalent compound and n is an integer of at least 3, tetrablock copolymer, e.g., A-B-A-B, and pentablock copolymers having a structure of A-B-A-B-A.

The at least one block copolymer can include blends of at least two different block copolymers. When the at least one block copolymer includes a blend of at least two different block copolymers, the properties stated herein take into account all of the at least two different block copolymers. For example, if more than one block copolymer is used in the adhesive composition, the diblock content is the average of the diblock content of all block copolymers.

For example, the diblock content of a blend of 50% by weight block copolymer A (diblock content=70) and 50% by weight block copolymer B (diblock content=30) is calculated as follows:

Diblock content=0.5(70%)+0.5(30%)=35+15=50%

In preferred embodiments, the at least one block copolymer is a triblock block copolymer having aromatic end blocks. More preferably, the at least one block copolymer is selected from a triblock styrenic block copolymer with aromatic end blocks.

Useful vinyl aromatic compounds include, e.g., styrene, alpha-methylstyrene, o-methylstyrene, m-methylstyrene, p-methylstyrene, p-tert-butylstyrene, 2,4-dimethylstyrene, 2,4,6-trimethylstyrene, diphenylethylenes including stilbene, vinyl naphthalene, vinylanthracene, vinyltoluene (a mixture of meta- and para-isomers of methylstyrene), vinylxylene, and combinations thereof. Suitable conjugated dienes include, e.g., butadiene (e.g., polybutadiene), isoprene (e.g., polyisoprene), 2,3-dimethyl-1,3-butadiene, 1,3-pentadiene, 1,3-hexadiene, and combinations thereof, and hydrogenated versions thereof including, e.g., ethylene, propylene, butylene and combinations thereof.

The A block can also include a small amount (e.g. no greater than 10 wt % based on the weight of the A block) of a structural unit derived from unsaturated monomers other than the vinyl aromatic compounds including, e.g., 1-butene, pentene, hexene, butadiene, isoprene, methyl vinyl ether, methyl methacrylate, vinyl acetate and combinations thereof. The B block can also include a small amount (e.g., no greater than 10 wt % based on the amount of the B block) of a structural unit derived from unsaturated monomers other than the conjugated diene including, e.g., 1-butene, 1-pentene, 1-hexene, methyl vinyl ether, styrene, methyl methacrylate, and combinations thereof.

Useful block copolymers include or may be based on, e.g., random styrene-butadiene polymers, styrene-butadiene block copolymers, multiarmed and repeating styrene-butadiene copolymers, styrene-butadiene-styrene (SBS) block copolymers, styrene-isoprene block copolymers, styrene-isoprene-styrene (SIS) block copolymers, styrene-multi-armed styrene-isoprene (SI)x block copolymers, styrene-ethylene-butylene-styrene block copolymers (SEBS), styrene-isobutylene-styrene block copolymers (SIBS), styrene-ethylene-ethylene-propylene-styrene block copolymers, styrene-ethylene-propylene-styrene block copolymers (SEPS) and combinations thereof.

The at least one block copolymer is preferably selected from a styrene-ethylene/butylene-styrene (SEBS), styrene-ethylene/propylene-styrene (SEPS), and styrene-ethylene-ethylene/propylene-styrene block copolymer, and most preferably is SEBS.

Block copolymers for use in the invention are commercially available under the KRATON® D and G series of trade designations from Shell Chemical Company (Houston, Tex.) including, e.g., KRATON D 1163 and 1117 and KRATON G 1652, 1657, 1726 and 1730, EUROPRENE® Sol T trade designation from EniChem (Houston, Tex.), SEPTON® trade designation from Septon Company of America (Pasadena, Tex.) including SEPTON® S 1001 styrene-ethylene-propylene-styrene block copolymer, and SEPTON® 4030, 4033, 4044, 4055 and 4077 block copolymers, and VECTOR® series of trade designations from Dexco (Houston, Tex.) including VECTOR® 4211 styrene-isoprene-styrene block copolymer.

Preferred examples of styrene-isoprene (SI) or styrene-isoprene-styrene (SIS) include KRATON D 1117 and KRATON D 11161 NS, available from Kraton Polymers, US, VECTOR 4114A and VECTOR 4411 A from Dexco Polymers, USA.

Also suitable as the block copolymer component in the present invention are based thermoplastic elastomers such as from the Globalprene series, available from LCY Chemical Corp. Examples are GLOBALPRENE SEBS 9550, 9551, 9552, 9553, or 9554.

Preferably, the at least one block copolymer has a styrene content of about 10 to about 50 weight percent, preferably about 20 to about 40 weight percent. In one embodiment, the styrene content of the at least one block copolymer is preferably about 25 to about 40 weight percent. In another embodiment, the styrene content of the at least one block copolymer is preferably 10 to 25 weight percent.

The at least one block copolymer is preferably a styrenic block copolymer. More preferably, the styrenic block copolymer has a triblock, radial or multiblock content of less than 20 weight percent, based on the total weight of the hot melt adhesive composition, and a melt flow rate at 230° C. under a load of 2.16 kg of less than 80 g/10 min.

The at least one block copolymer can comprise diblock. In one embodiment, the diblock content of the at least one block copolymer is at least about 20 percent by weight, at least about 25 percent by weight, between about 20 and about 80 percent by weight, between about 25 and about 75 percent by weight, or even between about 50 and 80 percent by weight.

The at least one block copolymer is present in the hot melt adhesive composition in an amount of from about 10 to about 50 weight percent, between about 12 to about 45 weight percent, between about 15 to about 42 weight percent, between about 17 to about 40 weight percent, between about 10 to 30 weight percent, or even between about 30 and about 50 weight percent.

In a preferred embodiment the block copolymers have a melt flow index between about 0.1 g/10 min and about 500 g/10 min, preferably between about 1 g/10 min and about 300 g/10 min and most preferably between about 2 g/10 min and about 200 g/10 min, most preferred between about 4 g/10 min and about 150 g/10 min at 230° C./5 kg.

Plasticizer

A further essential component of the inventive hot melt adhesive composition is at least one plasticizer. The plasticizer may be included in an amount of from about 15 to about 50 weight percent, from about 15 to about 45 weight percent, from about 20 to about 40 weight percent, from about 20 to about 35 weight percent, from about 22 to about 33 weight percent, or even from greater than 25 to 35 weight percent.

Suitable plasticizers include e.g. oil, polybutene, or a combination thereof. Useful classes of oils include, e.g., naphthenic petroleum-based oils, medicinal white oils, paraffinic oils, mineral oils, animal oils, vegetable oils, synthetic oils, derivatives of oils, glycerol esters of fatty acids, and combinations thereof. Preferably, the plasticizer is a paraffinic or naphthenic mineral oil. In one embodiment, the plasticizer is a naphthenic mineral oil, such as CALSOL 550 available from Calumet Lubricants.

Semicrystalline Polyolefin

The hot adhesive composition of the present invention may also comprise a semicrystalline polyolefin as an optional component. The semicrystalline polyolefin may be included in an amount of up to about 25 weight percent, based on the total weight of the hot melt adhesive composition. Suitable examples of polyolefins include homogeneous linear or substantially linear interpolymers of ethylene and α-olefin and propylene-based polymers.

The term "interpolymer" is used herein to indicate a copolymer, or a terpolymer, or a higher order polymer. That is, at least one other comonomer is polymerized with ethylene to make the interpolymer.

Homogeneous ethylene/alpha-olefin interpolymers differ from amorphous polyolefins also described as amorphous polyalphaolefins (APAO), with regard to homogeneity, molecular weight distribution ($M_w/M_n$), as well as comonomer (alpha-olefin) content. Amorphous polyolefins are homopolymers, copolymers and terpolymers of $C_2$-$C_8$ alpha-olefins which are typically polymerized by means of processes which employ Ziegler-Natta catalysts, resulting in a relatively broad molecular weight distribution, typically greater than 4. In contrast, the homogeneous ethylene/alpha-olefin interpolymers useful in the inventive adhesive composition are characterized as having a narrow molecular weight distribution. The homogeneous ethylene/alpha-olefins have a $M_w/M_n$ of less than 4, preferably less than 3, more preferably from 1.5 to 2.5, even more preferably from 1.8 to 2.2, and most preferably about 2.0. Homogeneous ethlylene/alpha-olefins useful for the invention can be produced by use of constrained geometry catalysis (e.g. metallocene catalysis), or alternately by any other catalyst that results in the desired molecular weight distribution. Further, whereas amorphous polyolefins produced from Ziegler-Natta catalysis typically have an alpha-olefin content greater than 50 wt-%, homogeneous ethylene/alpha-olefin interpolymers useful in the present invention are predominantly ethylene, having a greater ethylene content than comonomer content.

It is also noted that substantially linear interpolymers useful in the invention differ from low density polyethylene prepared in a high pressure process. In one regard, whereas low density polyethylene is an ethylene homopolymer having a density from about 0.900 to about 0.935 $g/cm^3$, the homogeneous linear and substantially linear interpolymers useful in the invention typically require the presence of a comonomer to reduce the density.

The homogeneous ethylene/alpha-olefin interpolymer usable in the present invention is a homogeneous linear or substantially linear ethylene/alpha-olefin interpolymer. By the term "homogeneous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer, prepared in a solution polymerization process, has a melting peak greater than 115° C. (such as is the case of polymers having a density greater than about 0.940 $g/cm^3$), it does not additionally have a distinct lower temperature melting peak.

Substantially linear ethylene interpolymers are homogeneous interpolymers typically having long chain branching. The long chain branches of substantially linear ethylene interpolymers typically have the same comonomer distribution as the interpolymer backbone and can be as long as about the same length as the length of the interpolymer backbone. When a substantially linear ethylene/alpha-olefin interpolymer is employed in the practice of the invention, such interpolymer will be characterized as having an interpolymer backbone substituted with from 0.01 to 3 long chain branches per 1000 carbons. Methods for determining the amount of long chain branching present, both qualitatively and quantitatively, are known in the art.

The homogeneous ethylene/alpha-olefin interpolymer is an interpolymer of ethylene with at least one comonomer selected from the group consisting of $C_3$-$C_{10}$ alpha-olefins. Exemplary $C_3$-$C_{10}$ alpha-olefins include propylene, isobutylene, 1-butene, 1-hexene, 4-methyl-1-pentene, 1-heptene, and 1-octene. Preferred alpha-olefins include 1-butene, 1-hexene, 4-methyl-1-pentene, 1-heptene, and 1-octene, more preferably 1-hexene and 1-octene, particularly 1-octene.

The molecular weight (high temperature GPC) of the homogeneous ethylene/alpha-olefin interpolymer will be selected on the basis of the desired performance attributes of the adhesive formulation. Typically, the homogeneous ethylene/alpha-olefin interpolymer will have a number average molecular weight of at least 800 grams/mole, preferably at least 1,300 and no more than 100,000 g/mole. Ultra low molecular weight homogeneous ethylene/alpha-olefin interpolymers are considered to have a number average molecular weight of less than about 12,000 g/mole, typically from about 8,000 to about 12,000 g/mole.

In the composition of the present invention it is particularly preferred to use at least one homogeneous linear or substantially linear interpolymer of ethylene and 1-octene, preferably having a number average molecular weight from about 9,000 to about 12,000 g/mole.

The hot melt adhesive compositions of the invention may include homogeneous ethylene/alpha-olefin interpolymers typically having a melt index or melt flow index of greater than about 50 g/10 min, greater than about 100 g/10 min, from about 100 to about 1,500 g/10 min (at 190° C./2.16 kg), or even preferably from about 400 to about 800 g/10 min. Indices as described herein are determined by the procedure of ASTM-D 1238.

The density of the homogeneous ethylene/alpha-olefin interpolymer will be selected on the basis of the desired performance attributes of the adhesive formulation. Typically however, the homogeneous ethylene/alpha-olefin interpolymer will have a density of at least about 0.850 g/cm$^3$, preferably at least about 0.860 g/cm$^3$, and more preferably at least about 0.870 g/cm$^3$. For the majority of the preferred compositions for targeted adhesive applications, the homogeneous ethylene/alpha-olefin interpolymer will have a density of no more than about 0.965 g/cm$^3$, preferably no more than about 0.900 g/cm$^3$, more preferably no more than about 0.890 g/cm$^3$, and even more preferably no more than about 0.885 g/cm$^3$, and most preferably no more than about 0.880 g/cm$^3$. Specifically preferred, the at least one homogenous linear or substantially linear interpolymer of ethylene and 1-octene has a density of from about 0.860 to about 0.890 g/cm$^3$.

The hot melt adhesive composition of the present invention may include at least one homogeneous ethylene/alpha-olefin interpolymer. The homogeneous ethylene/alpha-olefin interpolymer may be present in the adhesive composition of the invention in an amount of up to about 25 weight percent, up to about 20 weight percent, such as up to about 15 weight percent, based on the total weight of the adhesive composition and provided that the total amount of semicrystalline polymer does not exceed 25 weight percent.

In preferred embodiments, the at least one homogenous linear or substantially linear interpolymer of ethylene and alpha-olefin comprises a substantially linear interpolymer of ethylene and 1-octene which is grafted with a dicarboxylic acid anhydride, preferably a maleic anhydride grafted ethylene/1-octene interpolymer.

Homogeneous linear ethylene/alpha-olefin interpolymers are currently available from Mitsui Petrochemical Company under the trade name "TAFMER" and from Exxon Chemical Company under the trade name "EXACT". Substantially linear ethylene/alpha-olefin interpolymers are available from the Dow Chemical Company as AFFINITY polyolefin plastomers and elastomers, and ENGAGE polyolefin elastomers. Specifically preferred for use in the present invention are for example AFFINITY GA 1875, GA 1900, GA 1950 and GA 1000R. AFFINITY GA 1000R is a preferred maleic anhydride grafted ethylene/1-octene interpolymer.

Propylene-based polymers may also be employed as semicrystalline polyolefins. The propylene-based polymer can be a homopolymer or copolymer. The propylene-based polymer preferably has a melt viscosity at 190° C. of about 750 mPa·s to about 20000 mPa·s, more preferably 750 to 15,000, more preferably 5000 mPa·s to about 10,000 mPa·s. It may be employed in an amount of up to 25 weight percent, preferably up to about 20 weight percent, such as up to about 15 or 13 weight percent. For example, propylene-based homopolymers such as L-MODU S-400 or propylene-based copolymers such as LINXAR 127 available from ExxonMobil may be employed.

Resins

The hot melt adhesive composition according to the invention also comprises as an essential component at least one resin. As used herein, the term "tackifier" or "resin" means any of the compositions described below which are useful to impart tack to the hot melt adhesive composition. ASTM D-1878-61T defines tack as "the property of a material which enables it to form a bond of measurable strength immediately on contact with another surface".

The hot melt adhesive of the invention comprises from 15 weight % to less than about 50 weight % of the at least one resin, from about 15 weight % to about 45 weight % of the at least one resin, preferably from 15 weight % to about 40 weight %, more preferably from about 15 to about 35 weight %, still more preferably from about 20 to about 35 weight %, still further preferably from about 22 to about 33 weight % of the at least one resin. Resins can be at least partially hydrogenated in order to improve stability for bulk handling. Preferred resins have Ring and Ball softening point of at least about 75° C., preferably at least about 100° C.

The resins can be liquid or solid at room temperature. Suitable classes of resins include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof, terpenes, modified terpenes and hydrogenated versions thereof, natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, and phenolic-modified pentaerythritol esters of rosin.

Examples of useful polyterpene resins include polyterpene resins having a softening point, as determined by DIN EN 1427 (Ring and Ball) of from about 75° C. to about 180° C., hydrogenated polyterpene resins, and copolymers and terpolymers of natural terpenes (e.g. styrene-terpene, alpha-methyl styrene-terpene and vinyl toluene-terpene). Examples of useful aliphatic and cycloaliphatic petroleum hydrocarbon resins include aliphatic and cycloaliphatic petroleum hydrocarbon resins having Ring and Ball softening points of from about 75° C. to about 140° C. (e.g., branched and unbranched C5 resins, C9 resins, and C10 resins) and the hydrogenated derivatives thereof.

Useful resins are commercially available under a variety of trade designations including, e.g., the ESCOREZ series of trade designations from Exxon Mobil Chemical Company (Houston, Tex.) including ESCOREZ 1310 LC, ESCOREZ 5400, ESCOREZ 5415, ESCOREZ 5600, ESCOREZ 5615, and ESCOREZ 5690, the EASTOTAC series of trade designations from Eastman Chemical (Kingsport, Tenn.) including EASTOTAC H-100R, EASTOTAC H-100L, and EASTOTAC H130W, the WINGTACK series of trade designations from Cray Valley HSC (Exton, Pa.) including WINGTACK 86, WINGTACK EXTRA, and WINGTACK 95, the PICCOTAC, PICCOTEX and KRISTALEX series of trade designations from Eastman Chemical Company (Kingsport, Tenn.) including, e.g., PICCOTEX 120, PICCOTAC 8095 and KRISTALEX 3100, ARKON M-100 of trade designations from Arakawa Europe GmbH, Germany, SUKOREZ SU-90, SUKOREZ SU-100, or SUKOREZ SU-120 of trade designations from Kolon Industries Inc., Korea, and SYLVARES 7115 and SYLVARES SA 140 of trade designations from Arizona Chemical, USA.

In a preferred embodiment, the at least one resin comprises a combination of at least two different resins. The combination of at least two different resins comprises at least one aromatic hydrocarbon resin and at least one aliphatic hydrocarbon resin. Aromatic hydrocarbon resins may also be referred to as endblock modifying resins. Aromatic hydrocarbon resins typically have a content of aromatic monomers of more than 50 weight percent, such as more than 60 weight percent. Aliphatic hydrocarbon resins may be referred to as midblock modifying resins. The aliphatic hydrocarbon resin is present at from about 10 percent to about 40 percent by weight, from about 15 percent to about 35 percent by weight, or even from about 17 percent to about 33 percent by weight. The aromatic hydrocarbon resin (endblock modifying resin) may be employed to impart further cohesive strength. The aliphatic hydrocarbon resin (midblock modifying resin) is used for providing sufficient tack. Aliphatic hydrocarbon resins include slightly aromatic versions having up to 15 weight percent of aromatic monomers. By selecting an appropriate ratio of aromatic hydrocarbon resin to aliphatic hydrocarbon resin it is possible to achieve a desired adhesion/cohesion balance while avoiding surface tackiness. The aromatic resin is present at from about 1 to about 15 weight percent, preferably about 1 to about 10 weight percent, or even more preferably from 2 to about 7 weight percent based on the total weight of the hot melt adhesive. In a preferred embodiment, the weight ratio of aromatic hydrocarbon resin to aliphatic hydrocarbon resin is 1:20 to 1:2, more preferably is 1:15 to 1:3, and still more preferably is 1:10 to 1:5.

Examples of suitable the aliphatic hydrocarbon resin include but are not limited to aliphatic and cycloaliphatic hydrocarbon resins, hydrogenated hydrocarbon resins, terpenes, modified terpenes and hydrogenated versions thereof; natural rosins, modified rosins, rosin esters, and hydrogenated versions thereof; and combinations thereof, including slightly aromatic resins having a content of aromatic monomers of up to 15 weight %.

Suitable examples of the aromatic hydrocarbon resin include but are not limited to aromatic hydrocarbon resin comprises monomers selected from the group consisting of styrene, alpha methyl styrene, vinyl toluene, indene, or any other aromatic monomer or end block associating monomer. The aromatic hydrocarbon resin can have a softening point of at least about 100° C., at least about 110° C., or even at least about 120° C.

Waxes

Waxes are an optional component of the inventive hot melt adhesives. Waxes are commonly used to modify the viscosity and reduce tack. Waxes may be included in the hot melt adhesive compositions of the present invention only in low amounts, at concentrations less than 10 wt-%, preferably at concentrations ranging up to 7 wt-%, more preferably in amounts ranging up to 5 wt-%, such as up to about 3 wt-%, In one embodiment, the wax is present at from about 1 to about 7 percent by weight.

Waxes useful in the adhesives of the present invention include paraffin waxes, microcrystalline waxes, Fischer-Tropsch waxes, including medium MP grades such as Paraflint C-80, oxidized Fischer-Tropsch waxes, polyethylene wax and by-products of polyethylene wherein $M_w$ is less than 3000, polypropylene wax, and grafted or functionalized waxes such as hydroxy stearamide and fatty amide waxes. The terminology "synthetic high melting point" (HMP) waxes includes high density low molecular weight polyethylene waxes, by-product polyethylene waxes, and Fischer-Tropsch waxes.

Also suitable are ultra-low molecular weight ethylene/alpha-olefin interpolymers prepared using a constrained geometry (e.g. metallocene) catalyst, which may be referred to as homogeneous waxes. Such homogeneous waxes, as well as processes for preparing such homogeneous waxes, are set forth in the Examples below. Homogeneous waxes, in contrast to paraffinic waxes and crystalline ethylene homopolymer or interpolymer waxes, will have a Mw/Mn from 1.5 to 2.5, preferably from 1.8 to 2.2.

Homogeneous waxes will be either ethylene homopolymers or interpolymers of ethylene and a $C_3$-$C_{10}$ alpha-olefin. The homogeneous wax will have a number average molecular weight less than 6000, preferably less than 5000. Such homogeneous waxes will typically have a number average molecular weight of at least 800, preferably at least 1300.

In a preferred embodiment, the wax is selected from a group consisting of a polyethylene and a polypropylene wax or grafted or functionalized versions thereof.

Additives

The hot melt adhesive composition of the present invention may include additives commonly used in hot melt adhesives. For example, components can be added to modify the tack, color, odor, etc., of a hot melt adhesive. Additives such as antioxidants, for example, hindered phenolics (for example, IRGANOX® 1010, IRGANOX® 1076, all BASF, or VULKANOX BHT, Lanxess), phosphites (for example, IRGAFOS® 168, BASF), EVERNOX® 10, IRGANOX®

PS800 from BASF, or any mixtures thereof, antiblock additives (e.g. a coextrusion coating, packaging film, or dusting agents, etc.), pigments, rheology modifying additives (e.g. fumed silica), adhesion promoters and fillers (e.g. clay, talc, or carbonates), can also be included in the formulations.

It is generally preferred that the additives should be relatively inert and have negligible effects upon the properties contributed by the block copolymer, plasticizer, agent, and optional semicrystalline polyolefin and wax.

Additives may be generally used in small amounts, typically less than 10 wt.-%, preferably less than or up to 5 wt.-%, or even up to 3 wt.-%. One or more antioxidants are typically present in an amount of less than 2 wt.-%, preferably less than 1 wt.-%. Combinations of at least two different antioxidants are preferred, particularly preferred three different antioxidants in combination, to impart color stability. Antioxidants are specifically preferred ingredients to ensure thermal stability of the adhesives at high application temperatures of at least about 190° C., to avoid color changes such as yellowing, avoidance of which is typically desired for aesthetic reasons.

Uses

The hot melt adhesive compositions of the present invention are specifically designed and adapted for bonding bundles of metal containers such as cans into packs, preferably four, six or twelve-packs. In one use, the bundled cans contain from about 100 mls to about 1000 mls, preferably from about 150 mls to about 500 mls. Methods for producing such packs or bundles with the use of adhesives are generally described for example in international patent applications WO 2013/004337 A1 WO 2013/004339 A1, WO 2013/004340 A1, and WO 2013/004341 A1, all incorporated herein by reference. In such methods, the hot melt adhesive composition of the present invention can be applied directly onto the containers, on backing sheets between two groups of containers, or both, and allows separating the containers from groups in a non-destructive manner, for example when containers or tins are pulled apart by the consumer when beverages are consumed.

For example, the use of the hot melt adhesive composition for gluing two metal cans to each other a typical procedure involves that the molten adhesive having a temperature of about 150° C., to about 190° C. is rapidly shot with a conventional applicator onto at least one can, e.g. onto opposing sides on two standing cans (one shot takes approximately 50-100 ms), e.g., at the bottom and one on top in a spot where the two cans touch each other; after about 2 seconds the cans are combined and pressed together for about a few seconds, such as 5 seconds. The hot melt adhesive can be applied foamed or unfoamed.

The adhesive can be applied in a spot on each of the bottles to be bundled so as to give an adhesive to adhesive bond between the bottles. The adhesive could be the same adhesive on each bottle, or could be different adhesives. Alternatively, the adhesive could be applied to just one of the bottles to be bundled.

The particular application pattern may be varied as desired. For example, leaving out one or more adhesive spots for better can release from the pack can be envisaged, or more adhesive spots for large and heavy cans.

Typically, the amount of adhesive used per shot varies from about 20 to about 150 mg/shot, usually at about 80 mg/shot. Since such a process is dynamic, times and amounts may vary depending on the size of the metal containers such as cans and depending on the required ease of separation of the cans upon use by the customer.

Six packs or other desired pack sizes may be built up similarly, e.g. by gluing together pairs of bonded cans, or by bonding cans on backing sheets between two groups of containers, as described in the above mentioned international patent applications.

The adhesives of the invention have good low temperature (for refrigeration) and high temperature (for shipping) resistance and are able to remain bonded when exposed to condensed water on the surface of the can. Also, the adhesive compositions of the invention are flexible enough to allow can expansion during warming up when carbonized water or soft drinks are filled and glued together at low temperature such as 3° C. and expansion occurs when the can warms up to room temperature. For example, can expansion of low temperature filled metal cans can result in an extension in the range of 1-5 mm and the adhesive of the invention allows this kind of force and keeps the bond closed.

By directly bonding cans, the adhesives of the invention contribute in avoiding waste by no longer requiring a shrink wrap with LDPE film, a plastic ring or any other packaging to hold the cans into packs. This saves considerable amounts of energy since, for example, shrink wrapping involves six-packs being moved through a heating tunnel which uses large amounts of energy. Furthermore, the new packing process with the inventive adhesives provides smaller packing line footprint and increased packing line speeds. Also, the optical appearance of sixpacks is improved, since undesirable creases in the shrink wrap are avoided. This is highly desirable, because beverage filling companies are especially serious about this. Generally, the present invention advantageously helps to avoid any secondary packaging of container packs, such as carton or cardboard cases or sheaths, plastic rings or sheaths, etc.

EXAMPLES

In the context of the present invention, unless indicated otherwise, the melt flow rate, melt flow index or simply melt index (MI) is determined in accordance with ASTM D 1238 at a standard temperature of 190° C. and at 2.16 kg load.

The viscosity is determined similar to method ASTM D-3236 as follows. The viscosity of a sample is determined using a Brookfield Laboratories DVH, DV-II, or DV-III Viscometer. The spindle used is a SC-27 hot melt spindle suitable for measuring viscosities in a range between about 100 mPa·s and about 4,000,000 mPa·s. The spindle speed is typically 20 rpm. The sample is placed in a pre-warmed measuring cell, which in turn is inserted into the heating element/container and is locked into place. The viscometer apparatus is lowered and the spindle is submerged into the sample. The sample is heated until it is melted with additional sample being added until the melted sample is about 5 mm higher than the cylinder of the measuring spindle. The viscometer is turned on and set to a shear rate that leads to a torque reading in the range of from 30% to 60%. Readings are taken every minute for about 15 minutes or until the values stabilize. The final reading can be obtained after 30 min and is recorded in mPa·s.

The softening point is determined according to DIN EN 1427 (Ring and Ball) with the Ring and Ball instrument MC753 as summarized as follows. Two shouldered rings are heated to melt temperature and are placed onto a silicon-papered glass-plate and the melted substance is poured into the rings. After cooling, the excess materials were cut off and the samples were placed into the sample holder of the apparatus and the ball-centering guide with the balls is placed above the samples. A 600 ml NF beaker is filled with 500 ml glycerol and is placed on the heating plate of the MC 753 apparatus. The frame, which is ready for measurement with the shouldered rings, is placed into the beaker in such a way that it is centered on the pins. The temperature sensor is adjusted in the therefore designed opening in the frame and the MC 753 apparatus is activated by choosing the measuring point (keyboard 1-10, basic unit). After a certain pre-heating time, the program automatically runs with a heating rate of 5° C. per minute until the balls fall. The measurement is completed when both balls have fallen down and two temperatures are shown on the display.

Bundled can Performance Testing

Packs were made using six 12 ounce (355 ml) coated aluminum cans, about 5 inches tall, in a 3 by 2 can configuration. A hand extrusion applicator was used to apply about 0.1 g adhesive shots, two shots per bond. There were 14 bonds, 28 shots per six pack. The adhesive shots were applied about 1 inch (2.5 cm) from the top and about 1 inch (2.5 cm) from the bottom of each can. The open time for the hand bonds was about 5-10 seconds.

The bonded packs were aged at room temperature overnight and then aged at the specified temperature for at least 24 hours. The testing described below was performed at room temperature immediately after removing the packs from the specified temperature environment.

Step 1 (Perform 5 times) Drop the six pack down to a rigid surface from about 20-40 cm
Step 2 (Perform 5 times) Tilt the six pack over onto a rigid surface alternating to the right and to the left
Step 3 (Perform 5 times) Bump the six pack lightly against a rigid horizontal surface holding onto the pack by the end two cans
Grade 1 The six packs passed all testing steps and the cans showed strong bonding and handling
Grade 2 The six packs passed the drop tests and the tilt tests, but failed the bump tests
Grade 3 The six packs passed a few drop tests, but failed before 5 tests
Grade 4 The six packs failed after the first drop test or fell apart during handling before testing
Polymer density is determined according to method ASTM D 1505.

Materials:
The following materials were used in the below examples:
Block Copolymers:
KRATON G 1657, Kraton polymers, SEBS, 30% diblock
KRATON G 1726, Kraton polymers, SEBS, 70% diblock
Plasticizer:
CALSOL 550 is a naphthenic mineral oil available from Calumet Lubricants
ONDINA 941 is a paraffinic mineral oil available from Shell Deutschland Oil GmbH
Aliphatic Hydrocarbon Resins:
ESCOREZ 5400 is a tackifying resin available from ExxonMobil based on cycloaliphatic hydrocarbon resin and having a softening point of 100° C.
ESCOREZ 5600 is a high softening point tackifying resin available from ExxonMobil based on aromatic-modified, cycloaliphatic hydrocarbon resin and having a softening point of 100° C. and an aromatic content of 8-11 weight percent.
Aromatic Hydrocarbon Resin:
PICCOTEX 120 is a hydrocarbon resin made from pure aromatic monomer having a softening point of 118° C. from Eastman Chemical Company (Kingsport, Tenn.)
Wax:
AC 596 is a polypropylene wax grafted with maleic acid available from Honeywell International Inc.
MICROCRYSTALLINE WAX HMP is a high melt point hydrogenated microcrystalline wax available from Shell Deutschland Oil GmbH
Semicrystalline Polyolefin:
L-MODU S-400 is a propylene homopolymer having a melt viscosity at 190° C. of 9000 mPa·s available from Idemitsu Kosan Co., Ltd.
AFFINITY G 1950 is an ethylene/octene interpolymer having a melt index of 500 g/10 min (190° C.) available from Dow Chemical Company
Illustrative Antioxidants Include:
IRGANOX PS 800, Ciba/BASF, dilaurylthiodipropionate
EVERNOX 10, Everspring Chemical Co., sterically hindered phenolic antioxidant
EVERNOX 76GF, Everspring Chemical Co., is a phenolic primary antioxidant
IRGANOX 1010, Ciba/BASF
IRGAFOS 168, BASF, tris(2,4-di-tert-butylphenyl)phosphite
VULKANOX BHT, Lanxess, 3,5-Di-tert-butyl-4-hydroxytoluol
ARENOX DL, thioester antioxidant Hot melt adhesives were produced having the compositions shown in Table 1 and Table 2 below with the amounts given in weight percent.

TABLE 1

|  | E1 | E2 | E3 | E4 | E5 | E6 |
|---|---|---|---|---|---|---|
| KRATON G 1657 |  |  |  |  |  |  |
| KRATON G 1726 | 39.5 | 37.5 | 37.5 | 37.5 | 37.5 | 37.5 |
| CALSOL 550 | 32.8 | 29.8 |  | 29.8 | 31.2 | 31.2 |
| ONDINA 941 |  |  | 29.8 |  |  |  |
| ESCOREZ 5600 | 27 | 24.6 | 24.6 | 24.6 | 25.7 | 25.7 |
| PICCOTEX 120 |  | 5 | 5 | 5 |  |  |
| SHELL MICROWAX HMP |  | 2.5 | 2.5 |  | 2.5 |  |
| AC-596 |  |  |  | 2.5 | 2.5 | 5.0 |
| Antioxidants | 0.7 | 0.6 | 0.6 | 0.6 | 0.6 | 0.6 |
| Viscosity @ 135° C. [mPas] | 7700 | 8250 | 12700 | 10150 | 6600 |  |
| Viscosity @ 149° C. [mPas] |  | 3850 | 5238 | 4563 |  |  |
| Viscosity @ 163° C. [mPas] |  |  |  |  |  |  |
| Tri-block content (weight %) | 11.85 | 11.25 | 11.25 | 11.25 | 11.25 | 11.25 |
| Aromatic/Aliphatic Tackifier Ratio | — | 1:4.9 | 1:4.9 | 1:4.9 | — | — |
| Bundled Can Performance Test |  |  |  |  |  |  |

TABLE 1-continued

|  | E1 | E2 | E3 | E4 | E5 | E6 |
|---|---|---|---|---|---|---|
| Aging @ Room Temperature | 1 |  |  |  |  | 1 |
| Aging @ 5° C. | 1 | 1 | 1 | 1 | 1 | 1 |
| Aging @ 35° C. | 1 | 1 | 2 | 1 | 1 | 1 |
| Ease of Can Separation - Aged at Room Temperature | Easy |  |  |  |  | Easy |

TABLE 2

|  | E7 | E8 | E9 | E10 |
|---|---|---|---|---|
| KRATON G 1657 | 20 | 20 | 20 | 20 |
| CALSOL 550 | 32.8 |  | 32.8 | 32.8 |
| ONDINA 941 |  | 32.8 |  |  |
| ESCOREZ 5400 | 24.5 | 24.5 | 24.5 | 24.5 |
| PICCOTEX 120 | 2.5 | 2.5 | 2.5 | 2.5 |
| Polypropylene | 10 | 10 | 20 | 5 |
| Interpolymer | 10 | 10 |  | 15 |
| Antioxidants | 0.2 | 0.2 | 0.2 | 0.2 |
| Viscosity @ 149° C. [mPas] | 12950 | 15650 |  | 13700 |
| Viscosity @ 163° C. [mPas] |  | 9500 |  | 8925 |
| Tri-block content (weight %) | 14 | 14 | 14 | 14 |
| Aromatic/Aliphatic Tackifier Ration | 1:9.8 | 1:9.8 | 1:9.8 | 1:9.8 |
| Bundled Can Performance Test |  |  |  |  |
| Aging @ Room Temperature |  |  | 1 |  |
| Aging @ 5° C. | 1 | 1 | 1 | 2 |
| Aging @ 35° C. | 1 | 1 | 1 | 1 |

What is claimed is:

1. A container pack comprising a plurality of containers, wherein the containers are bonded to each other with a hot melt adhesive composition comprising based on the total weight of the hot melt adhesive composition:
   a) from about 10 to about 50 weight percent of at least one block copolymer;
   b) from about 15 to 50 weight percent of at least one plasticizer;
   c) from about 15 to 50 weight percent of at least one resin;
   d) optionally up to 25 weight percent of at least one semi crystalline polyolefin;
   e) optionally up to 10 weight percent of at least one wax;
   wherein the at least one block copolymer has a triblock, radial or multiblock content of less than 20 weight percent based on the total weight of the hot melt adhesive composition.

2. The container pack of claim 1 wherein the A hot melt adhesive composition comprises based on the total weight of the hot melt adhesive composition:
   a) from about 12 to about 45 weight percent, of the at least one block copolymer;
   b) from about 15 to about 45 weight percent, of at least one plasticizer;
   c) from about 15 to about 40 weight percent of the at least one resin;
   d) up to about 25 weight percent, of at least one homogenous linear or substantially linear interpolymer of ethylene and α-olefin;
   e) up to about 25 weight percent, of at least one semicrystalline propylene polymer; and
   f) from 0 to about 7 weight percent of at least one wax;
   wherein the at least one block copolymer has a triblock, radial or multiblock content of less than 20 weight percent based on the total weight of the hot melt adhesive composition.

3. The container pack of claim 1 wherein the at least one block copolymer has at least one A block that includes a vinyl aromatic compound, and at least one B block that includes an elastomeric hydrogenated or non-hydrogenated conjugated diene and combinations thereof, and wherein preferably the at least one block copolymer is a linear A-B block, linear A-B-A block, linear A-(B-A)$_n$-B multi-block, and radial (A-B)$_n$-Y block where Y is a multivalent compound and n is an integer of at least 3, linear A-B-A-B tetrablock, or linear A-B-A-B-A pentablock copolymer.

4. The container pack of claim 1 wherein the at least one block copolymer is selected from a group consisting of styrene-ethylene/butylene-styrene (SEBS), styrene-ethylene/propylene-styrene (SEPS) and styrene-ethylene-ethylene-propylene-styrene block copolymers.

5. The container pack of claim 1 wherein the at least one block copolymer is styrenic block copolymer and has a melt flow rate at 230° C. under a load of 5 kg of less than 100 g/10 min.

6. The container pack of claim 1, wherein the at least one plasticizer is a naphthenic or paraffinic mineral oil.

7. The container pack of claim 1, wherein the at least one semicrystalline polyolefin comprises a homogenous linear or substantially linear interpolymer of ethylene and α-olefin has a melt flow index in the range of about 100 to about 1,500 g/10 min (at 190° C./2.16 kg).

8. The container pack of claim 1, wherein the at least one semicrystalline polyolefin comprises a propylene polymer having a melt viscosity at 190° C. of about 1,000 to about 15,000 mPa·s.

9. The container pack of claim 1, wherein the hot melt adhesive composition has a Brookfield viscosity at a temperature of 149° C. from about 1,500 to about 50,000 mPa·s.

10. The container pack of claim 1, wherein the sum of components a), b), c), d), e) and f) amounts to at least 90 weight percent, of the total hot melt adhesive composition.

11. The container pack of claim 1 wherein the containers are metal.

12. The container pack of claim 11 wherein the metal containers are selected from a group consisting of aluminum and steel.

13. The container pack according to claim 11, wherein the metal containers comprise a coating.

14. The container pack according to claim 11, wherein the hot melt adhesive is removable from the metal containers.

15. The container pack of claim 1, wherein the at least one resin comprises a combination of at least two different resins, wherein at least one resin is an aromatic hydrocarbon resin and at least one resin is an aliphatic hydrocarbon resin, and wherein the weight ratio of aromatic hydrocarbon resin to aliphatic hydrocarbon resin is 1:15 to 1:3.

16. The container pack of claim 15, wherein
   (a) the aliphatic hydrocarbon resin is selected from aliphatic and cycloaliphatic hydrocarbon resins, hydrogenated hydrocarbon resins, terpenes, modified terpenes and hydrogenated versions thereof; natural rosins, modified rosins, rosin esters, and hydrogenated versions thereof; and combinations thereof; and (b) the aromatic hydrocarbon comprises monomers selected from the group consisting of styrene, alpha methyl styrene, vinyl toluene, indene or any other aromatic monomer or end block associating monomer, having a melting point of 100° C. or more.

17. A hot melt adhesive composition comprising based on the total weight of the hot melt adhesive composition:
(a) 30 to 50 weight percent of SEBS, having based on the total weight of the SEBS a diblock content of 50 to 80 weight percent;
(b) 20 to 35 weight percent of oil;
(c) 15 to 35 weight percent of cycloaliphatic resin;
(d) 1 to 10 weight percent of aromatic resin selected from alpha methyl styrene resins and vinyl toluene resins; and
(e) 1 to about 7 weight percent wax.

18. The hot melt adhesive composition of claim 17 wherein the total polymer comprises one or more styrene block copolymers having a triblock, radial or multi-block content of less than 17 weight percent based on the total weight of the hot melt adhesive composition.

19. The hot melt adhesive composition of claim 17 wherein the wax is selected from the group consisting of a maleated polyethylene wax and a maleated polypropylene wax.

20. The hot melt adhesive composition according to claim 17 wherein, the aliphatic resin is aromatic.

* * * * *